(No Model.)   3 Sheets—Sheet 1.
A. TETRAULT.
MECHANICAL MOVEMENT.
No. 392,238.   Patented Nov. 6, 1888.
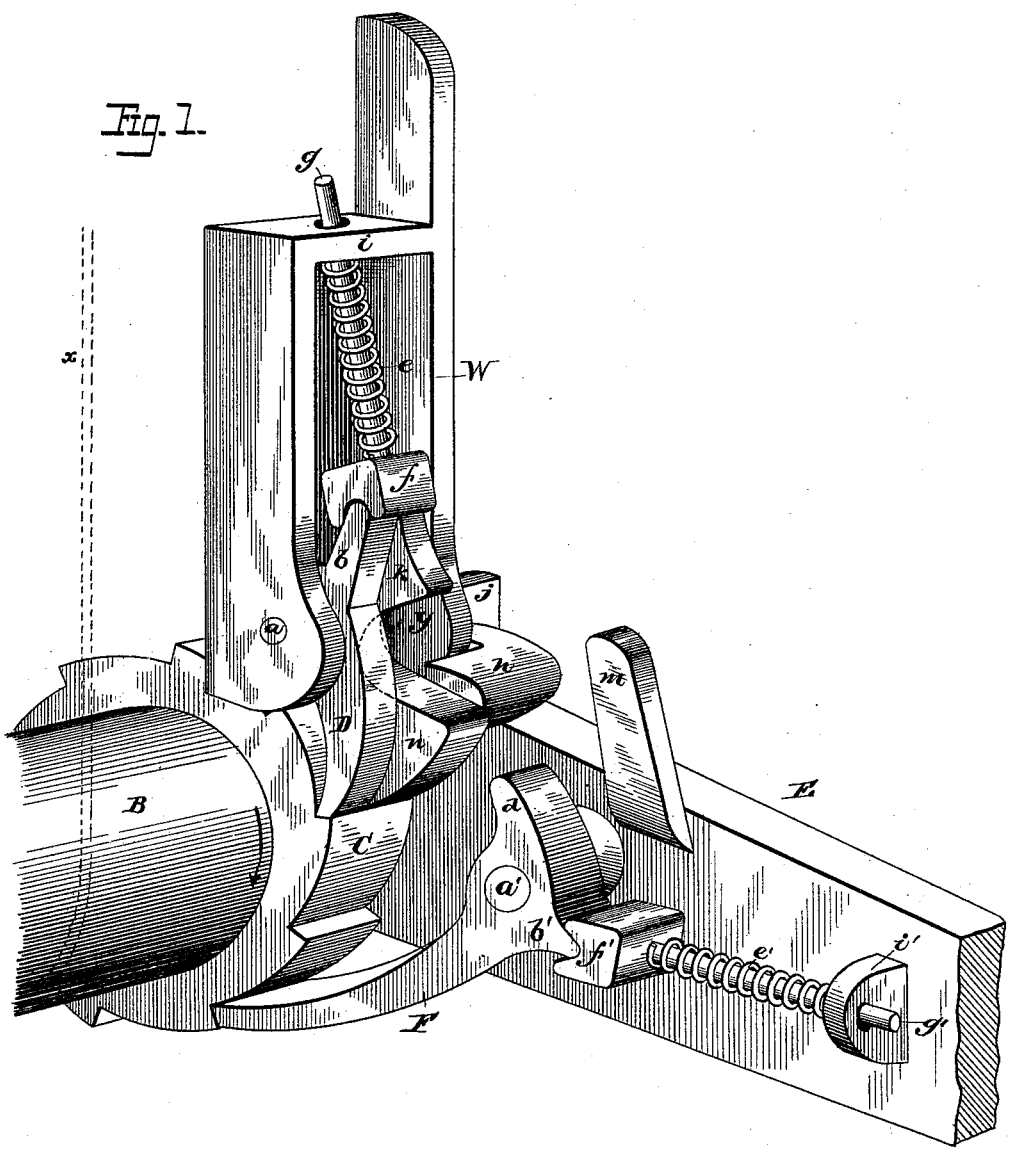

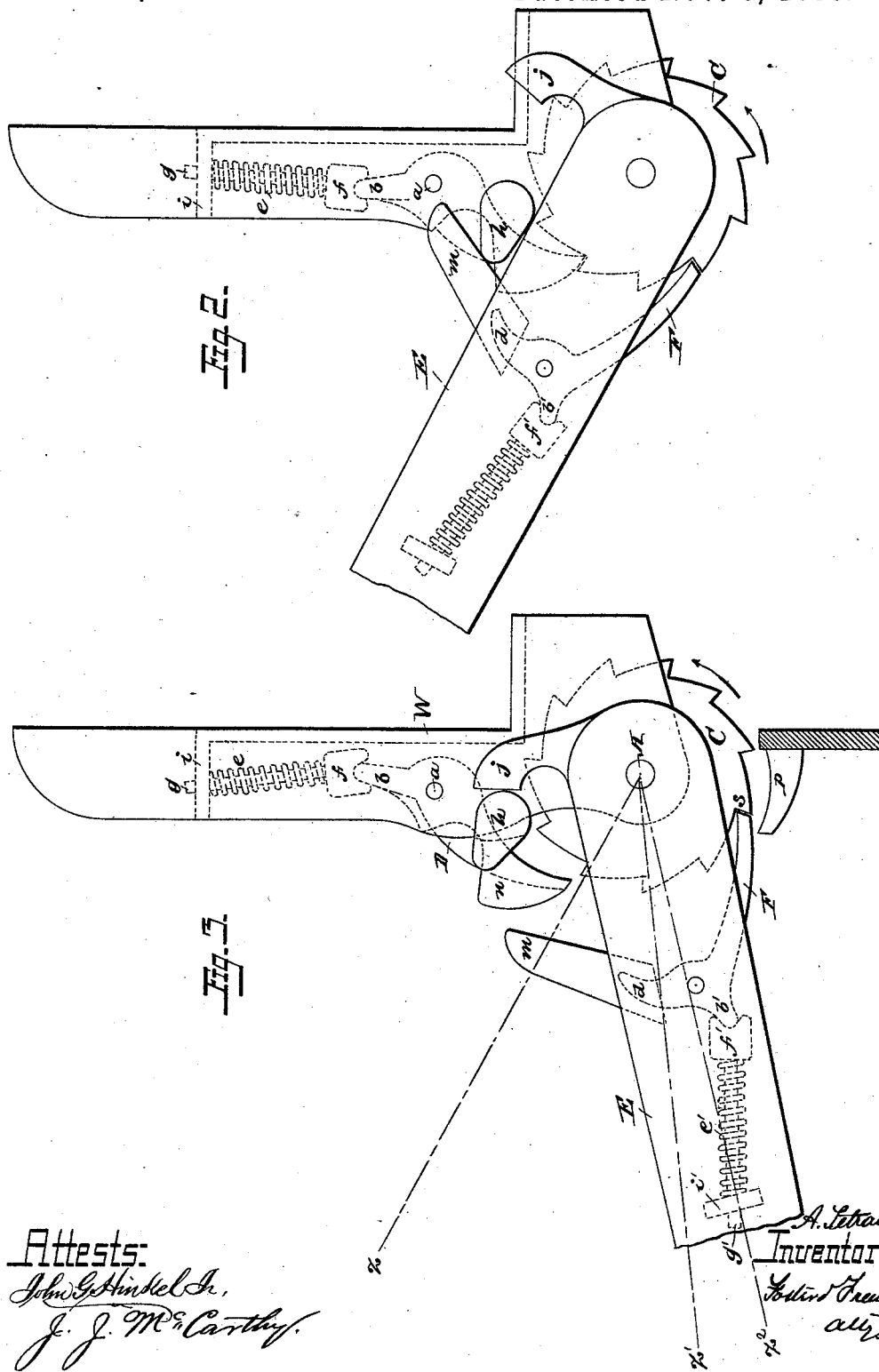

(No Model.) 3 Sheets—Sheet 3.
A. TÉTRAULT.
MECHANICAL MOVEMENT.
No. 392,238. Patented Nov. 6, 1888.
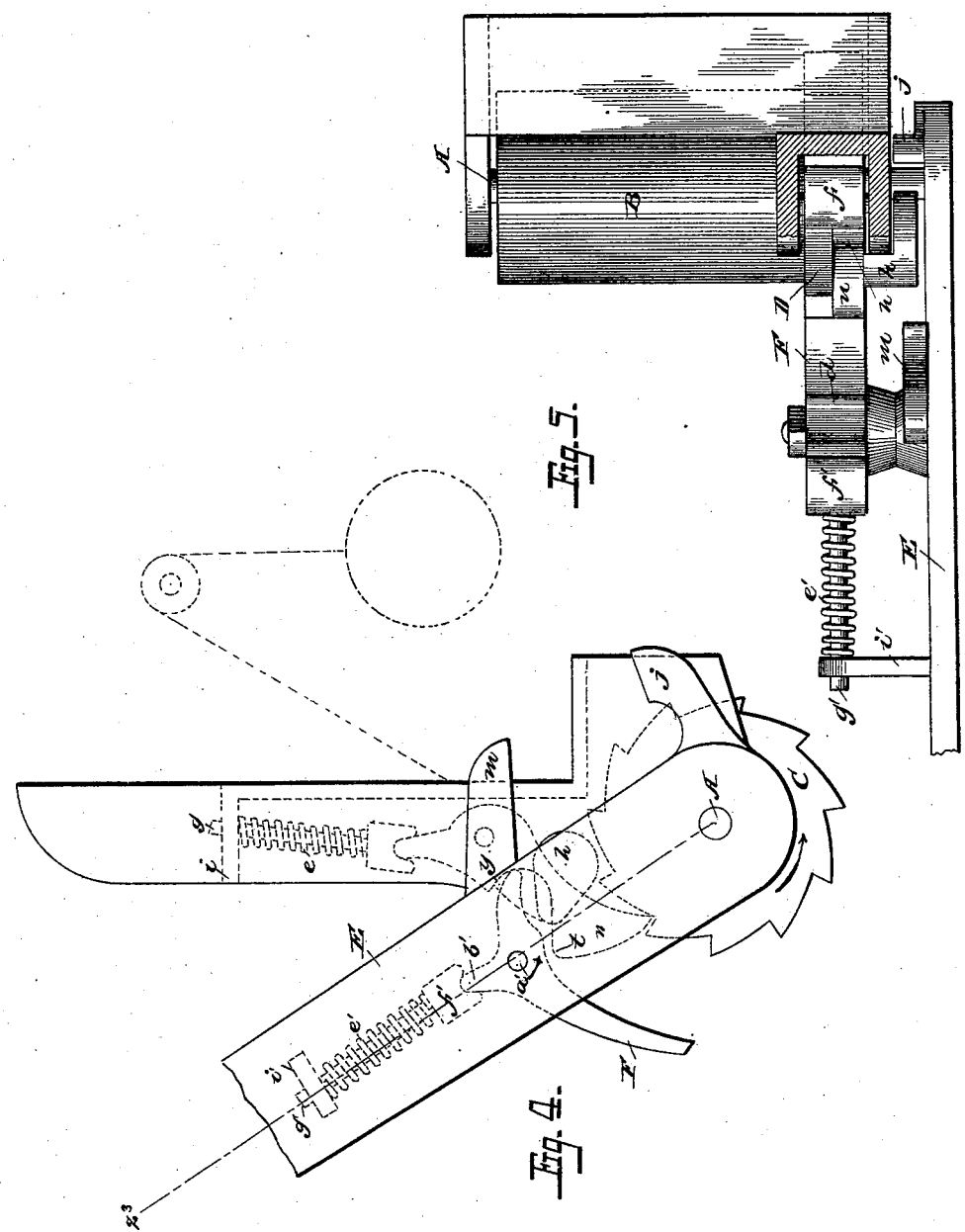

UNITED STATES PATENT OFFICE.

AMÉDÉE TÉTRAULT, OF ST. PAUL, MINNESOTA.

MECHANICAL MOVEMENT.

SPECIFICATION forming part of Letters Patent No. 392,238, dated November 6, 1888.

Application filed September 1, 1885. Serial No. 175,906. (No model.)

*To all whom it may concern:*

Be it known that I, AMÉDÉE TÉTRAULT, a citizen of the United States, and a resident of St. Paul, in the county of Ramsey and State of Minnesota, have invented certain new and useful Improvements in Mechanical Movements, of which the following is a specification.

My invention is a new mechanical movement whereby I am enabled to either raise or lower heavy objects or weights by vibrating a single lever, the reversing movement being effected by changing the extent to which the lever is vibrated, as fully set forth hereinafter, and as illustrated in the accompanying drawings, in which—

Figure 1 is a perspective view illustrating my improved mechanical movement. Figs. 2, 3, and 4 are side views of the device, showing the parts in different positions. Fig. 5 is a plan view, in part section, of the said device.

A represents a shaft, the movement of which in opposite directions is made the means of raising or lowering or reversing the motion of some object, as a weight, valve, gate, &c., connected directly or indirectly to the said shaft. For instance, the shaft may carry a pinion gearing with a sliding rack connected to the weight; but I have shown the shaft as carrying a drum, B, round which may be wound a chain, (indicated by the dotted lines $x$,) and passing over a guide-pulley and attached at its lower end to the weight. To prevent the descent of the weight except when it is to be properly lowered, I secure to the shaft a ratchet-wheel, C, and hang a pawl, D, to a shaft, $a$, so as to engage with the teeth of the ratchet, the shaft A and the shaft $a$ having their bearings in a frame, W.
In order to turn the shaft, I use a lever, E, pivoted to the shaft A, or at a point adjacent thereto, and carrying a pawl, F, which engages with the ratchet.

The pawl D is acted upon by a spring, $e$, which serves to retain the pawl either in contact with the ratchet-wheel or out of contact with the latter, according to the adjustment of the pawl. Thus when the parts are in the position shown in Figs. 1 and 2 the pressure of the spring tends to hold the pawl in contact with the teeth of the ratchet, the said spring acting upon a recessed block, $f$, receiving an arm, $b$, upon the pawl, which arm, when the pawl is in contact with the ratchet-teeth, is forward of the shaft or pivot $a$, so that the tendency of the spring when exerting a downward pressure upon said arm is to force it farther forward and hold the pawl in contact with the ratchet-wheel.

The spring $e$ may be a flat blade. I prefer, however, to use the spiral spring wound upon a rod, $g$, extending from the block $f$ through a cross-piece, $i$, of the frame, as shown. When the pawl D is thrown outward at the lower end sufficiently to carry the arm $b$ back of the pivot $a$, as shown in Fig. 3, the expansion of the spring tends to force the arm farther back and to hold the pawl out of contact with the ratchet in the position shown in Fig. 3. The pawl F, pivoted to the lever E, is acted upon by a spring, $e'$, which tends to hold the said pawl F in either of two positions in the same manner as does the spring $e$ when acting upon the pawl D. Thus the pawl F is provided with an arm, $b'$, and the spring $e'$ bears upon a notched block, $f'$, from which a rod, $g'$, extends through a perforated lug, $i'$, upon the lever E. When the pawl F is in contact with the ratchet-wheel, the arm $b'$ is below the pivot $a'$ and the spring $e'$ tends to hold the pawl in contact with the ratchet-wheel; but when the pawl F is thrown to the position shown in Fig. 4, so as to carry the arm $b'$ above the pivot $a'$, the action of the spring tends to raise the arm $b'$ and hold the pawl F away from the ratchet-wheel.

The pawl D is provided with a lug, $h$, which projects laterally beyond the side of the frame to a position to be struck by a finger, $j$, upon the lever E when the latter is turned downward to the position shown in Fig. 3, and the pawl D is also provided with a lug, $n$, and with a projection, $k$, having a lower inclined face, $y$, arranged to be struck by the end of an arm, $d$, upon the pawl F when the lever E is raised to the position shown in Fig. 4, and the lever is provided with a second finger, $m$, arranged to strike the lug $h$ when the parts are operated, as hereinafter described.

When it is desired to lift the weight or other object acted upon by the shaft A, the lever E is vibrated between the positions indicated by the lines $z\ z'$, Fig. 3, when the pawl F will engage with the teeth of the ratchet-wheel and the latter will be turned in the direction of its arrow as the lever descends, when the pawl D will engage with the teeth and lock the ratchet-wheel in its place as the lever is carried upward. By thus vibrating the lever between the positions indicated the shaft and its drum may be turned to any desired extent, so as to lift the weight as high as may be required, when the weight will be locked in its position after each downward movement of the lever.

When it is desired to lower or reverse the motion of the weight, the lever E is carried below the position indicated by the line $z'$ to that shown in Fig. 3 coinciding with the line $z^3$, when the finger $j$ will be brought in contact with the lug $h$ of the pawl D and will swing the latter out until the arm $b$ of the pawl passes inward beyond the pivot $a$, when the pawl will be held free from the ratchet-wheel. If now the lever E is elevated, the action of the weight will hold the teeth $s$ of the ratchet-wheel in firm contact with the pawl F, and the ratchet-wheel will turn in a direction the reverse of that indicated by its arrow, so as to unwind the chain and lower the weight. The lever E is now carried to a position above that indicated by the line $z$ to that indicated by the line $z^3$, Fig. 4, which action results in bringing the finger $m$ against the lug $h$, as shown in Fig. 2, thereby swinging downward the pawl D so as to engage with the ratchet-wheel, after which the arm $d$ of the pawl F is brought against the inclined face $y$ of the lug $k$, whereby the pawl F is turned to the position shown in Fig. 4, and is held in the said position free from contact with the ratchet-wheel C, so that the lever may be carried downward to a certain extent without turning the shaft. As, however, the point of the arm $d$ passes the point $l$ of the lug $n$, the pawl is swung in the direction of its arrow, Fig. 4, and its end is again brought in contact with the ratchet-teeth, after which a further downward movement of the lever again throws out the pawl D, when the above-described operations are repeated; but the movement of the parts may at any time be reversed by first carrying the lever to the position shown in Fig. 4 and vibrated within the positions bounded by the lines $z\ z'$.

To prevent any possible displacement or disconnection of the pawl F from the ratchet-wheel, after the pawl D has been thrown out to the position shown in Fig. 3, I so arrange a guard, $p$, upon the frame that it will extend beneath the pawl F as the lever E is lowered and prevent it from falling from contact with the ratchet-wheel teeth.

It will be evident that springs of different constructions may be variously arranged to throw the pawls to one side or the other of their pivots and that the contact arms, lugs, or fingers may be of different shapes and arranged differently, so that by extending the movement of the lever in either direction the positions of the pawls will be altered. I have illustrated the construction shown in the drawings for the purpose of explaining my invention, and not because it is embodied of necessity in such an arrangement of parts, although in practical operation the construction and arrangement shown have proved to be most effective.

The shaft A may in some instances be stationary, in which case the drum or cylinder B will turn upon the shaft.

I have not illustrated my improved device in connection with any machine, because it is applicable to very many machines and apparatuses of different kinds wherever it is necessary to raise and lower certain parts, and because it may be used independently of any other machine or apparatus—as, for instance, in raising or lowering water-gates, hatch-covers, &c.

Without limiting myself to the precise construction and arrangement of parts shown, I claim—

1. A mechanical movement consisting of a ratchet-wheel, a pawl pivoted adjacent thereto, a lever provided with another pawl adapted to engage with the ratchet-wheel, springs arranged to bear respectively upon the pawls and to hold each of them in different positions in and out of contact with the ratchet-wheel, and lugs and fingers, substantially as described, connected with said pawls, whereby the pawls are adjusted according to the extent of the movements of the lever, substantially as set forth.

2. The combination of the ratchet C, the pawl D, engaging therewith and provided with lugs $k\ h\ n$, a spring bearing upon the pawl and arranged to retain it either in or out of contact with the ratchet, the lever E, a pawl, F, carried thereby and provided with a lug or arm, $d$, fingers $j\ m$, and a spring bearing upon the pawl F and arranged to retain it either in or out of contact with the ratchet, substantially as described.

3. The combination, with the ratchet-wheel and lever carrying the pawl F, having an arm, $d$, of a pawl, D, engaging with the ratchet-wheel and provided with a lug, $k$, having an inclined face, $y$, a lug, $n$, adapted to engage with the arm $d$, and a lug, $h$, and springs bearing upon the pawls to retain them in or out of contact with the ratchet-wheel, according to the positions to which the pawls are adjusted, substantially as set forth.

In testimony whereof I have signed my name to this specification in the presence of two subscribing witnesses.

AMÉDÉE TÉTRAULT.

Witnesses:
WM. M. SMITH,
WM. S. SAYERS.